Sept. 24, 1968   J. J. HOOTE ETAL   3,403,334

SYSTEM FOR MEASUREMENT OF MICROWAVE DELAY LINE LENGTH

Filed Oct. 19, 1965   2 Sheets-Sheet 1

JIMMY J. HOOTE
LEE SUTTON
INVENTORS

BY *J. M. St. Amand*

ATTORNEY

JIMMY J. HOOTE
LEE SUTTON
*INVENTORS*

BY *J.M. St. Amand*

*ATTORNEY*

3,403,334
SYSTEM FOR MEASUREMENT OF MICROWAVE DELAY LINE LENGTH

Jimmy J. Hoote, Riverside, and Lee Sutton, Norco, Calif., assignors to the United States of America as represented by the Secretary of the Navy
Filed Oct. 19, 1965, Ser. No. 498,164
2 Claims. (Cl. 324—58)

The invention herein described may be manufactured and used by or for the Government of the United States of America for governmental purposes without the payment of any royalties thereon or therefor.

This invention relates to waveguides and more particularly to the measurement of microwave delay line length.

Microwave delay lines often consist of diverse waveguide components such as isolators, bends, attenuators, twists, phase shifters, ferrite devices, and other miscellaneous components, assembled together, often within a box or cabinet, to form a complex microwave signal conditioning system. For the purposes of certification and calibration, etc., it is sometimes desirable to measure the length of delay lines when recourse to the tape measure is neither practical or possible. A precise and convenient system for making delay line length measurements utilizing equipment customarily found in a microwave laboratory is described herein. This system is especially useful in testing long lines or when only the input and output ports of the line are accessible, wherein other methods, involving time delay techniques are particularly cumbersome.

This invention is related to our copending U.S. patent application Ser. No. 498,163 filed Oct. 19, 1965 which is also for a System for Measurement of Microwave Delay Line Length.

The system of the present invention depends upon reflections from a short. A swept microwave signal is introduced at a delay line input while the output end is shorted. The resulting series of standing waves is detected and viewed on an oscilloscope. A cavity frequency meter is inserted in the line and, with the resonance dip introduced, the frequency at which the nulls occur can be measured. Knowing the swept frequency range and the number of nulls generated thereby, the unknown line length can readily be calculated. A procedure to determine the number of nulls required for maximum accuracy is also set forth herein.

It is an object of the invention to provide a new, precise and convenient system for electrically measuring microwave delay line length.

Another object of the invention is to provide a system for measuring delay line length where only the input and output ports of the line are accessible.

A further object of the invention is to provide a system for complex delay line length measurement.

Other objects and many of the attendant advantages of this invention will become readily appreciated as the same becomes better understood by reference to the following detailed description when considered in connection with the accompanying drawings wherein.

The equivalent free space length of a rectangular waveguide is related to its physical length by $$L_{fs} = L_g \frac{f_o}{\sqrt{(f_o^2 - f_c^2)}} \quad (1)$$

where:
$L_{fs}$ = free space length
$L_g$ = physical length
$f_o$ = operating frequency
$f_c$ = cutoff frequency of the waveguide Consider a delay line of unknown physical length ($L_g$). If a microwave signal is applied at one end and the other end shorted, a series of voltage standing waves with voltage minimum at the short will appear on tht line as illustrated in FIG. 1.

Figure 1:
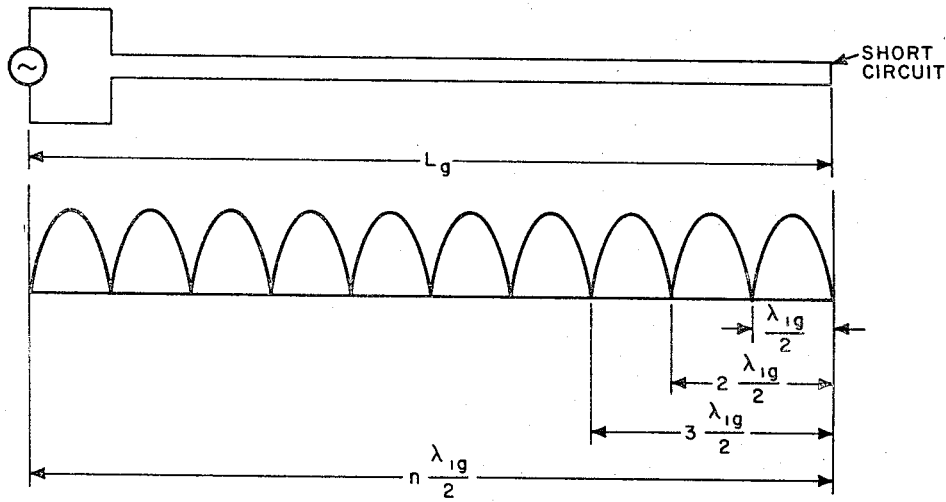
FIG. 1 illustrates standing waves caused by reflection at the shorted end of a transmission line.

From FIG. 1 it is apparent that, $$L_g = \frac{n \lambda_{1g}}{2} \quad (2)$$

where:
$n$ = total number of nulls along the lint
$\lambda_{1g}$ = guide wavelength of the transmitting frequency, in cm.

If from this static condition, the input frequency is changed to some value $f_2$, a number of nulls (N) are added to or removed from those previously existing along the line such that $$L_g = \frac{(n+N)}{2} \lambda_{2g} \quad (3)$$

Assume a frequency increase and solve Equations 2 and 3 for n:

$$\frac{n \lambda_{1g}}{2} = \frac{(n+N)}{2} \lambda_{2g} \quad (4a)$$

and $$n = N \frac{\lambda_{2g}}{\lambda_{1g} - \lambda_{2g}} \quad (4b)$$

Substituting Equation 4 into Equation 2 yields $$L_g = \frac{N}{2} \frac{\lambda_{1g} \lambda_{2g}}{\lambda_{1g} - \lambda_{2g}} \quad (5)$$

Equation 5 suggests that the physical length between any two points on a waveguide can be measured by placing a short at one point and a detector at the other.

For rectangular guide, Equation 5 can be simplified by using the following relations:

$$f = \frac{C}{\lambda} \quad (6a)$$

and $$\lambda_g = \frac{\lambda}{\sqrt{\left(1 - \left[\frac{\lambda}{\lambda_c}\right]^2\right)}} \quad (6b)$$

where:
$\lambda$ = free space wavelength, cm.
$f$ = transmitting frequency, in gc. (gigacycles)
$C$ = velocity of light (2.9979 × 10$^{10}$ cm./sec.)
$\lambda_c$ = cutoff wavelength for the waveguide.

Accordingly:

$$L_g = \frac{NC}{2} \left[ \frac{1}{\sqrt{(f_1^2 - f_c^2)} - \sqrt{(f_2^2 - f_c^2)}} \right] \quad (7)$$

where:
$f_1$ = highest selected frequency in gc.
$f_2$ = lowest selected frequency in gc.
$f_c$ = waveguide cutoff frequency
$N$ = the number of additional nulls generated as a result of changing the input frequency from $f_1$ to $f_2$.

Equation 7 is useful only if the three parameters, $f_1$, $f_2$, and N can be measured accurately, consistently and conveniently. The measurement set-up of FIG. 2 satisfies these criteria. Sweep oscillator 10 is repeatedly swept through a frequency range such that a series of standing waves is presented on the screen of oscilloscope 12. These standing waves are in fact the additional nulls (N) induced by the frequency sweep.

Frequency $f_1$ is established with the frequency meter 13 dip at the beginning of some convenient null. The frequency meter dip is then tuned through N nulls to frequency $f_2$. These values are recorded and substituted in Equation 7. The fixed length delta ($\delta$) is then subtracted from $L_g$ to give $L_\mu$, the length of the delay line. Delta ($\delta$) represents any length of waveguide added to the unknown for the purposes of measurement. Delta ($\delta$) is the fixed length between the center of the H-plane T 14 and the input to the delay line 15 whose length is unknown.

Figure 2:
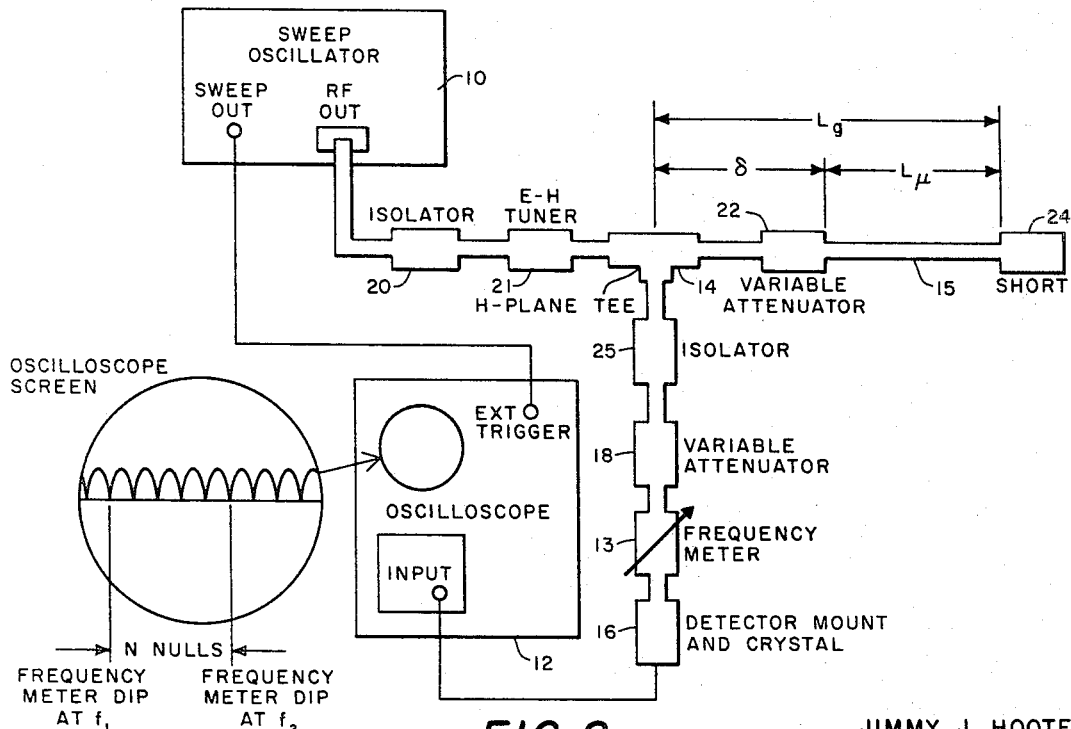
FIG. 2 is a diagrammatic illustration of the system of the present invention.

The arrangement of equipment in FIG. 2 has several advantages. Since the sweep oscillator 10 and dector 16 are located in separate arms of the nondirectional T 14, the detected signal appears as a fixed point source in the center of the T. Thus, the length of the detector arm is inconsequential, and the attenuator 18, frequency meter 13 and detector 16 can be placed at any convenient distance from the T and loop. The total length of the loop is $L_g = L_\mu + \delta$. Unlike a slotted line, T 14 is a fixed-position device and cannot be moved accidentally during the measurement to affect the value of $\delta$. Isolator 20 prevents reflected signals from perturbing sweep oscillator 10, whereas E-H tuner 21 is used to tune or match the line to prevent unwanted standing waves. Variable attenuator 22 in the loop is used for control of signal level, and is connected to the input port of the delay line 15 whose output port is shorted at 24. Isolator 25 in the detector arm prevents reflected signals from detector 16 from getting into the system.

The accuracy of this method is normally limited by the accuracy of the cavity frequency meter 13. With the system of FIG. 2 using, for example, a Hewlett-Packard 686C Sweep Oscillator and X532B Frequency Meter, a known 390.8-cm. line was repeatedly measured to within ±1.0 cm. The error introduced in aligning the cavity frequency meter dip with the beginning or end of the null and in interpolating the cavity frequency meter scale can be minimized by increasing the number of nulls used in the length calculation. This is implied by Equation 5, in which the wavelength difference is a denominator. The effect of increasing the number of nulls on the calculated length of a 390.8-cm. line is shown in FIG. 3.

Figure 3:
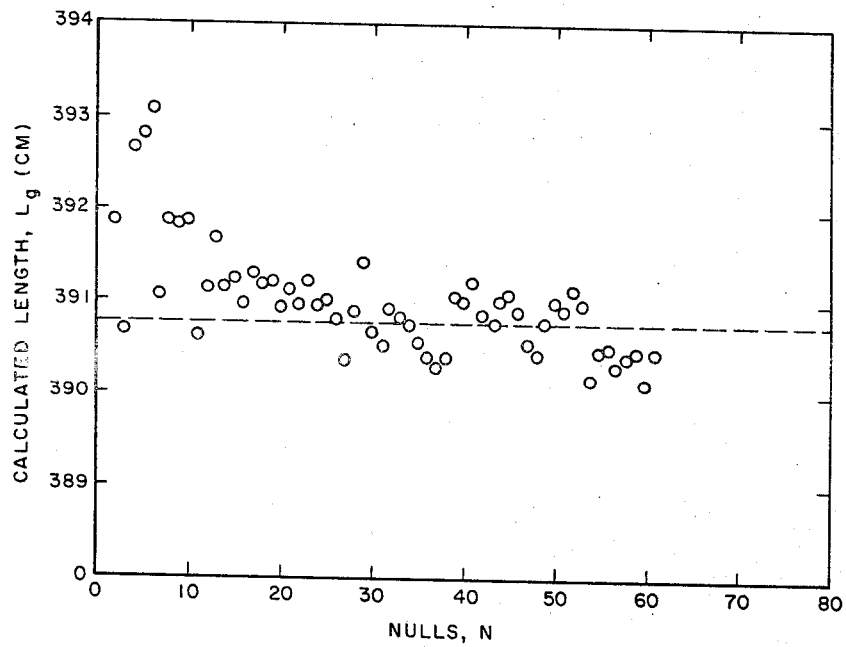
FIG. 3 shows the effect of nulls (N) on calculated length of 390.8-cm. delay line.
Figure 4:
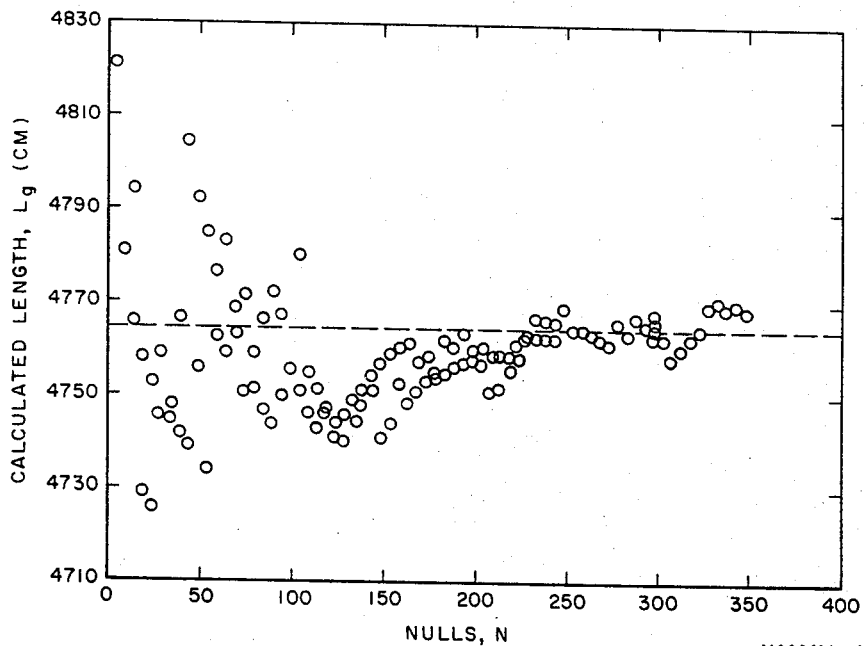
FIG. 4 shows the effect of nulls (N) on calculated length of a 4765-cm. delay line.

FIG. 3 indicates that the calculated length converges very closely to the true value as N is increased beyond 14. The same trend for a 4765-cm. line length is shown in FIG. 4. It is readily apparent that the error is minimized for all N above 230.

The standard deviation sigma ($\sigma$) for all measurements above $N=13$ in FIG. 3 is, $\sigma=0.331$ cm. and $3\sigma=0.993$ cm.

Thus, for all measurements where $N>13$ the confidence level is 99.7 percent for a ±1.0-cm. tolerance on line length (an error of 0.25 percent in 390.8 cm.).

In FIG. 4, for all measurements where $N>230$, $\sigma=2.885$ cm. Therefore, $3\sigma=8.654$ cm. and the tolerance is 0.18 percent with 99.7 percent confidence. From these two examples it is reasonable to expect a maximum error of ±0.25 percent provided N is taken sufficiently large.

Note that for the 390.8-cm. line at $N=14$, and for the 4765-cm. line at $N=230$, $$\frac{N}{n} = 0.1 \quad (8)$$

The similarity of this value for these two lines suggests an empirical relationship to determine an adequate value for N. Since $$n = \frac{2L_g}{\lambda_g} \quad (9)$$

then $$N = 0.2 \frac{L_g}{\lambda_g} \quad (10)$$

This reflection method of line measurement has one inherent limitation and this is the necessity of reflecting the signal back along the unknown loop. This results in doubling the effect of any loop attenuation and could necessitate in removal of any isolators in the line. In a practical situation lumped attenuators and isolators are common and their removal and replacement with waveguide could be difficult. Furthermore, due to the doubling effect of attenuation, the maximum allowable one-way loop attenuation is about 18–20 db. Another line requirement is reasonably low VSWR. Lines with VSWR greater than about 1:1.5 will present spurious reflections that tend to obscure the reflection from the short at 24. Thus, the T 14 and other system components must be well matched over the entire frequency band that is needed to generate an adequate number of nulls.

Obviously many modifications and variations of the present invention are possible in the light of the above teachings. It is therefore to be understood that within the scope of the appended claims the invention may be practiced otherwise than as specifically described.

What is claimed is:
1. A system for electrically measuring the length of a microwave delay line, comprising:
   (a) a sweep oscillator for repeatedly sweeping through a desired frequency range,
   (b) a display means for viewing series of standing waves generated by the sweeping oscillator,
   (c) a delay line of unknown length to be measured having its output port shorted,
   (d) a first waveguide means including a first waveguide isolator, an E-H plane tuner, an H-plane T and a first variable attenuator connected together in series and used to feed frequency swept signals from said sweep oscillator to the input port of said delay line,
   (e) a second waveguide means including a second waveguide isolator, a second variable attenuator, a frequency meter and a crystal detector connected in series for observing the signal power level in said H-plane T.
   (f) said crystal detector in turn being connected to said display means, and said observed signal power level being fed to and displayed on said display means for viewing and measuring the nulls thereof,
   (g) said frequency meter measuring the frequency of the signal at said H-plane,
   (h) the length of said delay line ($L_\mu$) being determined from the measured number of additional nulls (N), generated as a result of the frequency of said signal power level being changed from a first selected frequency ($f_1$) to a second selected frequency ($f_2$), and the measured value of the frequencies ($f_1$ and $f_2$) in accordance with the formula

$$L_\mu = L_g - \delta = \frac{NC}{2}\left[\frac{1}{\sqrt{f_1^2 - f_c^2} - \sqrt{f_2^2 - f_c^2}}\right] - \delta$$

where C is the velocity of light ($2.9979 \times 10^{10}$ cm./sec.); $f_c$ is the cutoff frequency of the waveguide of the system and, $\delta$ is the known length of any waveguide added to the delay line for the purpose of facilitating measurement.

2. A system for electrically measuring the length of a microwave delay line, comprising:
   (a) an RF signal generator means operable to sweep through a desired range of frequencies,
   (b) display means for viewing and measuring series of standing waves generated by said signal generator means,
   (c) a delay line of unknown length to be measured having its output shorted, (d) a first waveguide means including a T junction for feeding frequency swept signals from said signal generator means to the input of said delay line,
(e) a second waveguide means, including frequency measuring means and detector means, connected to said T junction for observing the signal power level in said T junction,
(f) said detector means being connected to said display means where nulls in said observed signal power level are displayed for measurement purposes,
(g) the length of said delay line ($L_\mu$) being determined from the measured number of additional nulls (N), generated as a result of the frequency of said signal power level being changed from a first selected frequency ($f_1$) to a second selected frequency ($f_2$) and the measured value of the frequencies ($f_1$ and $f_2$) in accordance with the formula $$L_\mu = L_g - \delta = \frac{NC}{2}\left[\frac{1}{\sqrt{f_1^2-f_c^2}-\sqrt{f_2^2-f_c^2}}\right]^{-\delta}$$

where C is the velocity of light ($2.9979 \times 10^{10}$ cm./sec.); $f_c$ is the cutoff frequency of the waveguide of the system and, $\delta$ is the known length of any waveguide added to the delay line for the purpose of facilitating measurement.

No references cited.

RUDOLPH V. RALINEC, *Primary Examiner.*

P. F. WILLE, *Assistant Examiner.*